United States Patent
Rogers et al.

(10) Patent No.: US 8,809,214 B2
(45) Date of Patent: Aug. 19, 2014

(54) REFRACTORY SLAG BAND

(75) Inventors: Norman Edward Rogers, Derbyshire (GB); David Kennedy, Glasgow (GB); David Millar, South Lanarkshire (GB); Shibiao Yang, Shanghai (CN)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 1036 days.

(21) Appl. No.: 12/735,762

(22) PCT Filed: Feb. 12, 2009

(86) PCT No.: PCT/GB2009/000389
§ 371 (c)(1),
(2), (4) Date: Sep. 5, 2012

(87) PCT Pub. No.: WO2009/103949
PCT Pub. Date: Aug. 27, 2009

(65) Prior Publication Data
US 2013/0045856 A1    Feb. 21, 2013

(30) Foreign Application Priority Data

Feb. 18, 2008 (EP) .................................... 08250550

(51) Int. Cl.
| | |
|---|---|
| C04B 35/482 | (2006.01) |
| C04B 35/52 | (2006.01) |
| B65D 5/74 | (2006.01) |
| C04B 35/66 | (2006.01) |
| B22D 41/50 | (2006.01) |
| C04B 35/626 | (2006.01) |
| C04B 35/01 | (2006.01) |

(52) U.S. Cl.
CPC ............. *C04B 35/66* (2013.01); *C04B 2235/76* (2013.01); *C04B 35/482* (2013.01); *C04B 2235/425* (2013.01); *B22D 41/505* (2013.01); *C04B 35/62665* (2013.01); *C04B 2235/3208* (2013.01); *C04B 35/013* (2013.01); *C04B 2235/9676* (2013.01); *C04B 2235/5427* (2013.01); *C04B 2235/48* (2013.01); *C12C 5/4613* (2013.01)
USPC .............. 501/103; 501/99; 501/104; 222/566

(58) Field of Classification Search
USPC ................................... 501/103, 104; 222/566
See application file for complete search history.

(56) References Cited

U.S. PATENT DOCUMENTS

| 3,887,387 A | 6/1975 | Sturhahn |
| 3,899,341 A | 8/1975 | Schwarz |

(Continued)

FOREIGN PATENT DOCUMENTS

| JP | 52-102308 A | 8/1977 |
| JP | 57-007367 A | 1/1982 |

(Continued)

OTHER PUBLICATIONS

International Search Report for PCT/GB2009/000389, mailed Apr. 23, 2009.

(Continued)

*Primary Examiner* — Karl Group
(74) *Attorney, Agent, or Firm* — Nixon & Vanderhye, P.C.

(57) ABSTRACT

Refractory cold start slag band including an admixture of partially stabilised zirconia and/or fully stabilised zirconia and monoclinic zirconia. The proportion of monoclinic relative to the total zirconia content is at least 50% by weight and the grain diameter of the monoclinic zirconia is from 0.25 to 0.5mm.

7 Claims, 4 Drawing Sheets

(56) References Cited

U.S. PATENT DOCUMENTS

| | | | |
|---|---|---|---|
| 4,513,089 A | | 4/1985 | Kummer et al. |
| 4,913,408 A | | 4/1990 | Hoggard et al. |
| 5,370,370 A | | 12/1994 | Benson |
| 6,586,355 B2 * | | 7/2003 | Hoover et al. ............... 501/101 |

FOREIGN PATENT DOCUMENTS

| | | | |
|---|---|---|---|
| JP | 62-148076 A | | 7/1987 |
| JP | 02164767 | * | 6/1990 |
| JP | 03-066462 A | | 3/1991 |
| JP | 07047465 | * | 2/1995 |
| JP | 2001080960 | * | 3/2001 |
| JP | 2004-066251 A | | 3/2004 |
| SU | 1346630 | * | 10/1987 |
| WO | WO 90/02822 A1 | | 3/1990 |

OTHER PUBLICATIONS

First Office Action dated Jul. 1, 2012, issued in corresponding Chinese Patent Application No. 2009801055579 (6 pgs).
Japanese Patent Application No. 60-290283, filed Dec. 23, 1985, Laid-Open Publication No. 62-148076, dated Jul. 2, 1987 (7 pgs).

* cited by examiner

REFRACTORY SLAG BAND

This application is the U.S. national phase of International Application No. PCT/GB2009/000389 filed 12 Feb. 2009 which designated the U.S. and claims priority to EP Patent Application No. 08250550.4 filed 18 Feb. 2008, the entire contents of each of which are hereby incorporated by reference.

This invention relates to a refractory band for use in metal teeming processes, in particular to a refractory band (commonly referred to as a 'slag band') for application to a refractory body that contacts slag in the continuous casting process for producing steel.

BACKGROUND OF THE INVENTION

In the continuous casting steel-making process, molten steel is poured from a ladle into a large vessel known as a tundish via a ladle shroud. The tundish has one or more outlets through which the molten steel flows from the tundish into one or more respective moulds. The molten steel cools and forms a solid skin in the moulds and eventually forms continuous solid strands of metal. A submerged entry nozzle or casting nozzle is located between the tundish and each mould to control the flow characteristics of the molten steel flowing from the tundish to the mould and prevent the ingress of air. The rate of steel flow into each mould is often controlled by a stopper rod which resides in the tundish and can be moved vertically by a lifting apparatus into and out of the inlet of the submerged entry nozzle.

Many of the refractory bodies, such as the ladle shroud, submerged entry nozzle and stopper rod, have regions that come into frequent contact with a layer of slag that settles on top of the molten metal. The slag is highly corrosive and thus all of the aforementioned devices are at risk of corrosion after being submerged or partially submerged in the molten metal for relatively short periods of time unless they are protected in some manner from the corrosive properties of the slag.

A common solution to this problem is to provide a "slag band" i.e. a wear resistant zone of material in the region of the refractory body that is likely to contact the slag in use. One such material is carbon-bonded zirconia-graphite. However, its use is hindered by the fact that zirconia is polymorphic, existing in a monoclinic form at room temperature, changing to a tetrahedral structure at 1170° C. and a cubic form at about 2300° C. The monoclinic to tetrahedral change is accompanied by a reversible volume change (shrinkage) of about 5% (see FIG. 1) which leads to cracking of the grains and hence failure of the refractory. This undesirable volumetric change has been alleviated to some extent by the addition of controlled quantities of various cubic oxides, such as calcia, magnesia and yttria. These stabilising oxides form a solid solution with the zirconia and give rise to a structure which is a mixture of cubic and monoclinic zirconias, known as 'partially stabilised zirconia' (PSZ). PSZ is utilized in slag bands as it is considered to exhibit the optimum balance of thermal expansion and thermal shock resistance properties.

A drawback associated with the use of PSZ for slag bands is that the high thermal expansion coefficient of the material ($10 \times 10^{-6}$/° C.) necessitates pre-heating of the refractory before it can be used for the flow of liquid steel. Pre-heat temperatures are normally in the range 900° C. to 1400° C. and pre-heat times are usually between 1 to 8 hours. This is clearly undesirable as it increases the cost of the process and causes a lengthy downtime if the casting process has to be stopped for any reason. Steel manufacturers require cold start capabilities from slag bands for submerged entry nozzles/shrouds in particular, in emergencies such as when a strand is lost because of failure to start. In order to maintain casting of steel in such circumstances, an un-preheated tube is put into service on a strand held in reserve. These cold start-up tubes may be provided with a slag band manufactured with approximately 10% of the zirconia replaced by silicon carbide and the tubes are decarburised. However, whilst the low thermal expansion of silicon carbide confers sufficient thermal shock resistance for a cold start, the silicon carbide is soluble in the mould slag. Hence, this serves only as a temporary measure as the corrosion resistance of the tube is seriously compromised.

SUMMARY OF THE INVENTION

The present invention aims to provide an improved refractory band, in particular a cold start slag band that overcomes or at least alleviates the aforementioned problems.

Accordingly, a first aspect of the present invention provides a refractory composition for use as a cold start slag band comprising an admixture of partially stabilised zirconia and/or fully stabilised zirconia and monoclinic zirconia, wherein the proportion of monoclinic relative to the total zirconia content is at least 40% by weight A second aspect of the present invention provides a refractory cold start slag band comprising an admixture of partially stabilised zirconia and/or fully stabilised zirconia and monoclinic zirconia, wherein the proportion of monoclinic relative to the total zirconia content is at least 40% by weight.

The inventors have surprisingly found that mixing partially stabilised zirconia (PSZ) or fully stabilised zirconia (FSZ) with monoclinic zirconia gives an overall thermal expansion that is much lower than that which is achieved with only PSZ or FSZ thereby enabling the refractory band to be used from a cold start whilst retaining durability. Whilst the inventors do not wish to be bound by theory, it is believed that the various types of zirconia cause a balancing effect between the thermal expansion of the PSZ/FSZ and the contraction of the monoclinic zirconia during heating of the band.

Monoclinic zirconia may comprise at least 50 wt %, or about 57 wt % of the total zirconia content. In other embodiments, the monoclinic zirconia may comprise at least 70 wt % of the total zirconia content.

In certain embodiments, the maximum amount of monoclinic zirconia relative to the total zirconia content may be 85% by weight (particularly when the remaining zirconia is FSZ). In other embodiments, the monoclinic zirconia content relative to the total zirconia content may be in the range of from 65 wt % to 90 wt % (particularly when the remaining zirconia is FSZ).

In other embodiments, particularly when the remaining zirconia is PSZ, the amount of monoclinic zirconia may be in the range of from 65 wt % to 80 wt %.

Any suitable size of grain of PSZ/FSZ and monoclinic zirconia may be provided in the admixture, with the size of grain of the PSZ/FSZ being the same or different to the size of grain of the monoclinic. However, in certain embodiments, the maximum grain diameter of the monoclinic is equal to or less than 1 mm, and in other embodiments is from 0.25 to 0.5 mm.

The PSZ and FSZ for use in the present invention may be formed by fusing zirconia with controlled quantities of various oxides, such as calcia, magnesia and yttria, most preferably calcia. It will be understood that for a given dopant such as calcia whether PSZ or FSZ is formed simply depends on the level of dopant added.

Other suitable components may be included in the composition or slag band in addition to the zirconia, most notably graphite. In certain embodiments, at least 50% by weight of the composition or slag band comprises the admixture of PSZ/FSZ and monoclinic zirconia, and in some embodiments at least 75% by weight.

The zirconia admixture may be bound by a carbon-based binder. The binder may comprise at least 2 wt %, or at least 3 wt % of the composition. In certain embodiments the binder may comprise no more than 10 wt % or no more than 6 wt % of the total composition. In yet further embodiments the binder may comprise 4 wt % of the composition.

According to a third aspect, the invention resides in a refractory article incorporating the cold start slag band of the second aspect.

The refractory band may be formed integrally with the refractory article that requires protection from the slag. The article may be for example a ladle shroud, stopper rod or submerged entry nozzle/shroud and preferably a submerged entry shroud. In certain embodiments, the band is co-pressed with the refractory body, the body being comprised of any suitable inert heat resistant material, such as a ceramic material.

Alternatively, the band may be formed separately to the refractory article and subsequently attached thereto. For example, the band may be in the form of an annular sleeve for attaching around the article in the region that, in use, contacts the slag. In certain embodiments, the internal dimensions of the sleeve correspond to the external dimensions of the refractory body around which the sleeve is to placed to create a protective barrier to prolong the life of the article.

The band should be of a sufficient thickness to protect the refractory article from the corrosive effect of the slag for the duration of the article's working life. It is to be appreciated that the width of the refractory band will be dependent upon the length of the refractory article that comes into contact with the slag. Typically, the refractory band has a width of about 20 cm. In some embodiments, a transition layer is provided between the refractory band and the refractory article, the transition layer being comprised of material that dampens the thermal expansion to address the difference in thermal expansion between the band and the article.

According to a fourth aspect of the present invention, there is provided a method of forming a submerged entry nozzle comprising co-isostatically pressing a refractory composition in accordance with the first aspect of the invention with refractory material to form the submerged entry nozzle incorporating a cold start slag band.

BRIEF DESCRIPTION OF THE DRAWINGS

For a better understanding of the present invention and to show more clearly how it may be carried into effect, reference will now be made by way of example only to the accompanying drawings in which.

DETAILED DESCRIPTION OF THE INVENTION

Figure 2:
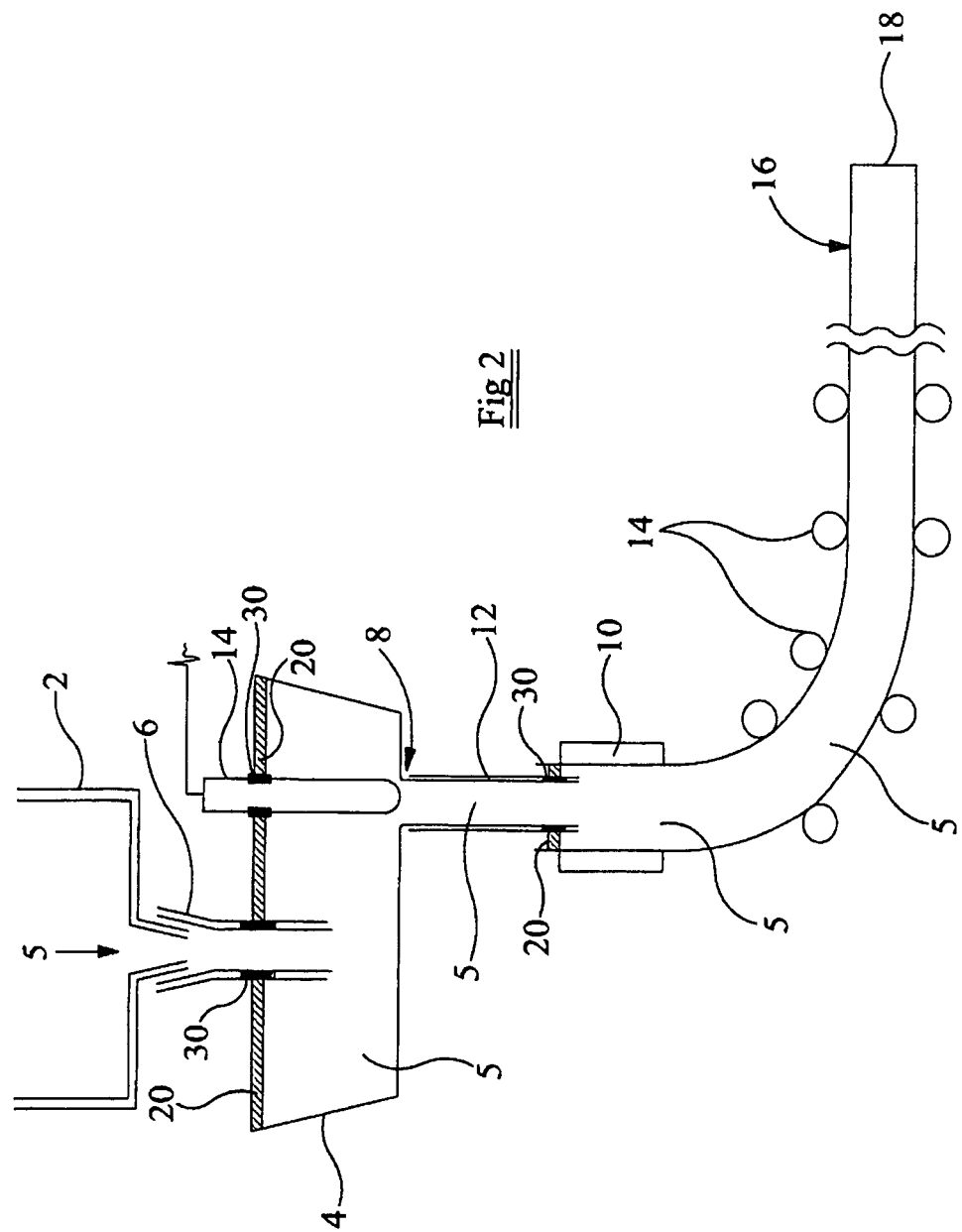
FIG. 2 is a schematic diagram of an apparatus for the continuous casting of molten metal incorporating several refractory bodies in accordance with the present invention.

FIG. 2 of the accompanying drawings illustrates schematically parts of an apparatus for the continuous casting of molten steel. Steel, is melted in a furnace (not shown) and transferred to a ladle 2. Molten steel S is poured from the ladle into a large vessel 4, known as a tundish. A generally tubular ladle shroud 6 is connected at an upper end to an outlet of the ladle and extends at its lower end beneath the surface of the metal in the tundish (at steady state casting condition). The tundish 4 has at least one outlet 8 that delivers molten steel from the tundish 4 to a water cooled mould 10 via a submerged entry nozzle 12. A reciprocally moveable stopper rod 14 is provided in the tundish 4 to regulate the flow of molten metal out of the tundish 4 into the submerged entry nozzle 12.

Once delivered to the mould 10, the surface of the steel adjacent the mould surfaces starts to solidify and the strand is curved via a series of rollers 14 to emerge as a horizontal slab. The solid steel is then cut into sections by gas torches 15. Other components that are standard in the art of steel casting, such as gate valves, tundish furniture and water cooling sprays, have been omitted from the diagram for simplicity.

It is evident from FIG. 2 that the ladle shroud 6, stopper rod 14 and submerged entry nozzle 12 all come into contact with the molten metal. The areas of these refractory bodies that are most at risk are those that come into contact with a layer of highly corrosive slag 20 that forms on the top of the molten metal. Unless suitably protected by a barrier layer, the refractory bodies would corrode rapidly in the regions contacting the slag 20 thus reducing their operating life, hence a refractory slag band 30 is provided around each refractory body 6,12,14 in the area that comes into contact with slag 20.

FIG. 2 shows refractory bands 30 on each of the refractory bodies 6,12,14 that contact the molten steel but it is to be appreciated that this need not be the case or at least each refractory band 30 need not necessarily be in accordance with the present invention. Furthermore, it is envisaged that the refractory band of the present invention may be used to shield other bodies from the corrosive effects of the slag.

EXAMPLES

Test pieces were prepared in the following manner from the formulations listed in Table 1 below. Fused refractory oxides, namely partially stabilised zirconia (16 mol % calcia dopant) or fully stabilised zirconia and monoclinic zirconia were dry blended with graphite flake in an Eirich mixer for three minutes after which a liquid phenol formaldehyde resin was added. The mixing was continued for a further fifteen minutes after which the mixed material was cooled to room temperature and vibrationally filled into a mold after which it was isostatically pressed to shape.

Figure 3:
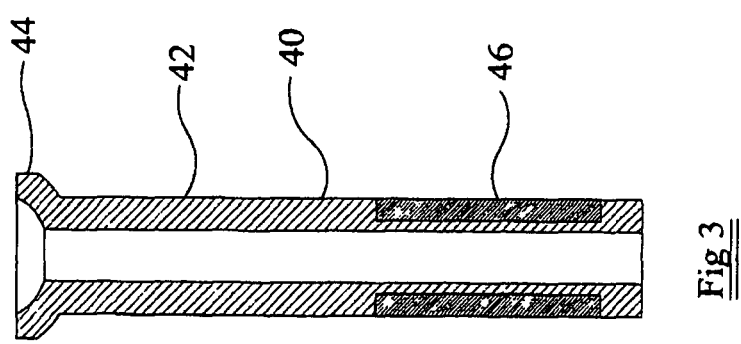
FIG. 3 is a cross sectional view of a test piece.

The shape adopted for the thermal shock tests was as shown in FIG. 3. basically the test pieces 40 are simplified nozzles consisting of a tubular conduit 42 with an outwardly flared upper end 44. Co-pressed into a lower region of the test piece is a slag band 46. The test pieces are prepared from standard alumina formulations (other than the slag band itself) in the usual manner.

The pressed piece was first cured to approximately 200° C. and then kilned to 900° C. in a reducing atmosphere. Testing of the various formulations involved subjecting 10 pieces of each formulation to the following conditions. The pieces were suspended in a sand box with their lower ends protruding. The sand box was then filled with sand coated with a phenol formaldehyde resin formulated so as to harden at room temperature. When the sand had hardened sufficiently to support the pieces the protruding ends of the test pieces were immersed in liquid steel (to approximately the midpoint of the slag band) at 1550° C. for ten minutes. The pieces were then examined visually for any thermal shock cracks in the zirconia-graphite slag band.

TABLE 1

| Ingredients[1] | Comp. Ex. 1 | Ex. 1 | Ex. 2 | Ex. 3 |
|---|---|---|---|---|
| Monoclinic zirconia[2] (proportion of zirconia) | 25.1(33) | 30.4(40) | 43.4(57) | 60.8(80) |
| PSZ[1] (proportion of zirconia) | 50.9(67) | 45.6(60) | 32.7(43) | |
| FSZ[1] (proportion of zirconia) | | | | 15.2(20) |
| Graphite | 13.0 | 13.0 | 13.0 | 13.0 |
| Carbon bond | 4.0 | 4.0 | 4.0 | 4.0 |
| Others (CaO, Si, MgO, $B_2O_3$) | 7.0 | 7.0 | 7.0 | 7.0 |

[1]quantities given in wt %
[2]grain size <0.50 mm

Of the ten pieces tested, all pieces having the formulation of Example 2 passed and did not exhibit cracking due to thermal shock. By contrast, seven of the test pieces formulated according to Comparative Example 1 cracked due to the thermal shock and so failed the test.

Figure 1:
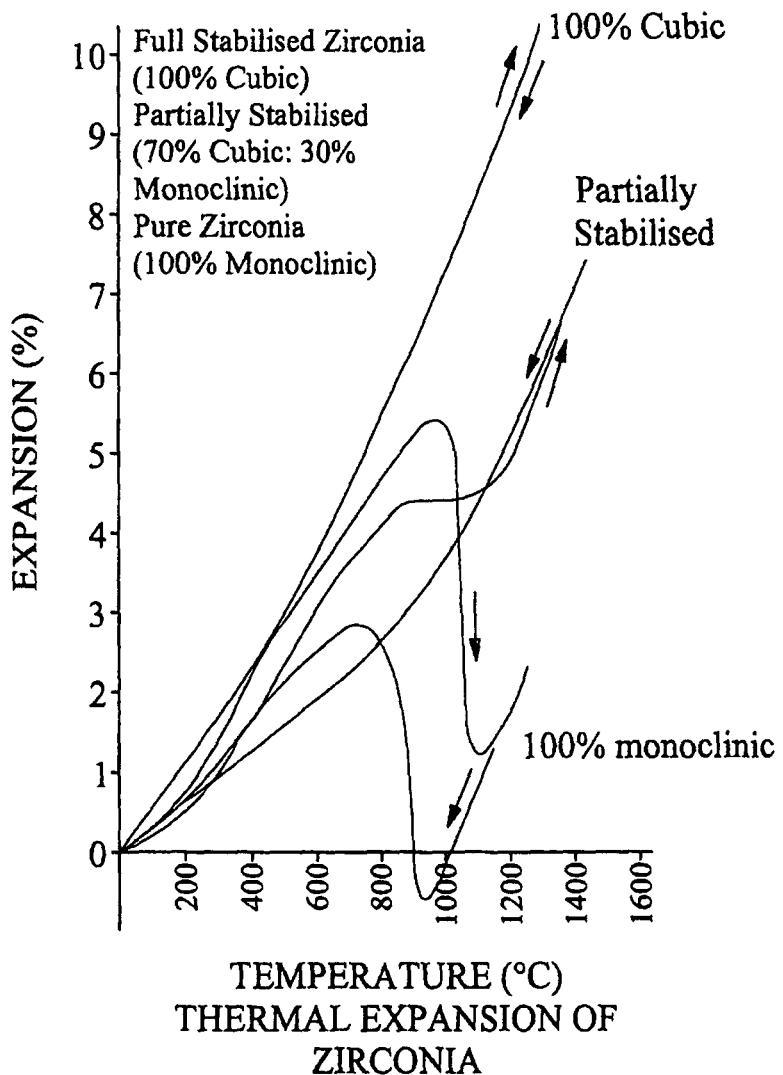
FIG. 1 is a graph illustrating the thermal expansion of various forms of zirconia.
Figure 4:
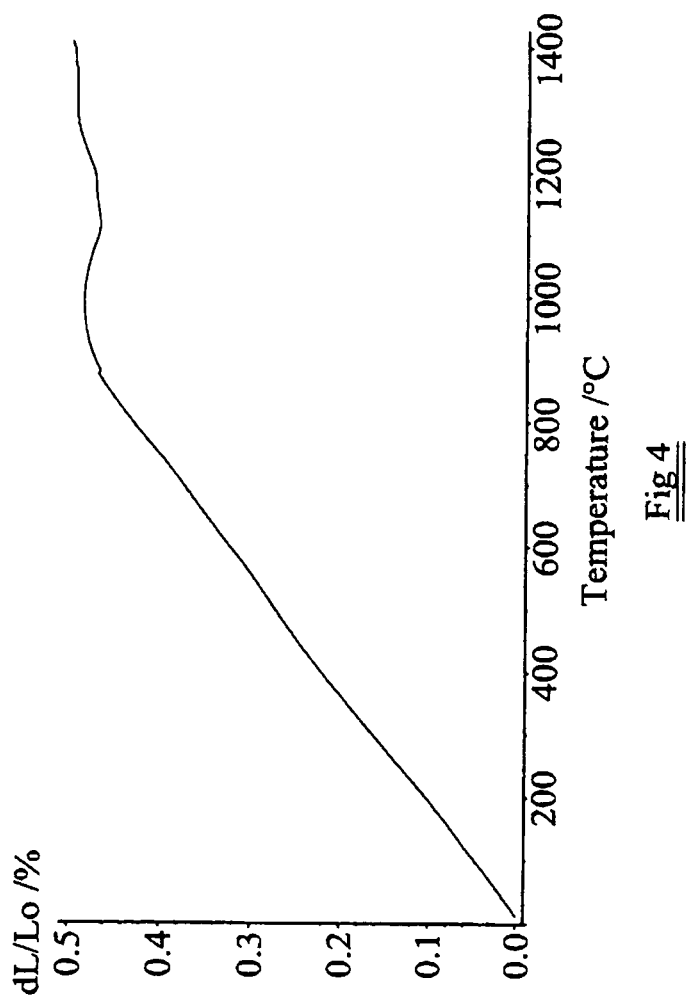
FIG. 4 illustrates the thermal expansion for a formulation of the present invention.

FIG. 4 shows a plot of thermal expansion against temperature (temperature rising) for a sample formulated according to Example 2. Thermal expansion is measured using a dilatometer (Model DIL402PC, Netzsch Geratebau GmbH). As can be seen, in contrast to the large contraction exhibited by monoclinic zirconia or the continuing relatively large expansions exhibited by PSZ and FSZ (FIG. 1), the formulation of Example 2 exhibits a steady expansion up to about 900° C. after which substantially no further expansion is observed.

Figure 5:
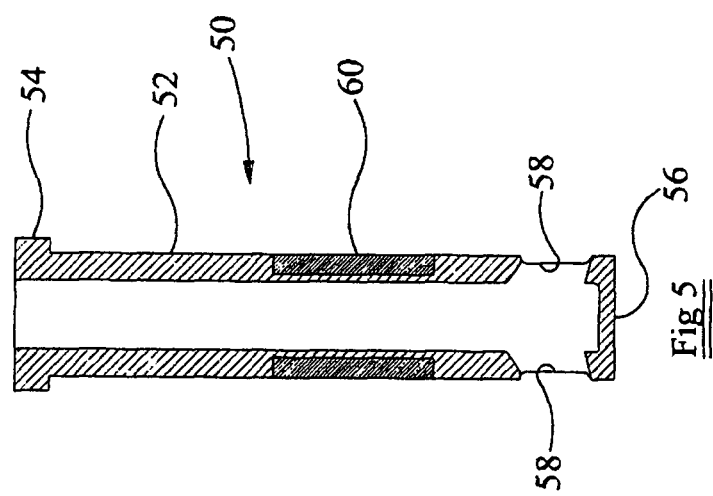
FIG. 5 is a is a cross sectional view of a submerged entry nozzle in accordance with the present invention

FIG. 5 shows a submerged entry nozzle (SEN) incorporating a slag band formulated to Example 2. The SEN 50 is similar to the test piece 40, being a generally tubular conduit 52 with a flange 54 at its upper end. The SEN is closed at its lower end 56 but is provided with two radial ports 58. The slag band 60 is generally intermediate the two ends of the SEN 50 In use the SEN 50 is clamped via the flange 54 to, for example, an inner nozzle of a tundish without the need for preheat. Molten steel flows through the conduit 52 and exits into the mould via the two radial ports 58.

The invention claimed is:

1. A refractory cold start slag band comprising an admixture of partially stabilised zirconia and/or fully stabilised zirconia and monoclinic zirconia, wherein the proportion of monoclinic relative to the total zirconia content is at least 50% by weight and the grain diameter of the monoclinic zirconia is from 0.25 to 0.5 mm.

2. The refractory cold start slag band as claimed in claim 1 additionally comprising graphite.

3. A refractory article incorporating the cold start slag band of claim 1.

4. The refractory article of claim 3 which is a submerged entry nozzle.

5. The refractory cold start slag band as claimed in claim 1, wherein the admixture contains FSZ and the monoclinic zirconia content relative to the total zirconia content is no more than 85% by weight.

6. The refractory cold start slag band as claimed in claim 1, wherein the admixture contains PSZ and the monoclinic zirconia content relative to the total zirconia content is no more than 65% by weight.

7. The refractory cold start slag band as claimed in claim 1, wherein at least 50% by weight of the admixture comprises the admixture of partially stabilized zirconia and/or fully stabilised zirconia and monoclinic zirconia.

* * * * *